United States Patent
Keefover et al.

(10) Patent No.: US 8,181,545 B2
(45) Date of Patent: *May 22, 2012

(54) ACTUATOR WITH INTEGRATED DRIVE MECHANISM

(75) Inventors: Robert D. Keefover, Lake Orion, MI (US); Murray Busato, Clinton Township, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 789 days.

This patent is subject to a terminal disclaimer.

(21) Appl. No.: 12/225,466

(22) PCT Filed: Apr. 4, 2007

(86) PCT No.: PCT/US2007/008323
§ 371 (c)(1), (2), (4) Date: Sep. 22, 2008

(87) PCT Pub. No.: WO2007/117473
PCT Pub. Date: Oct. 18, 2007

(65) Prior Publication Data
US 2009/0235766 A1 Sep. 24, 2009

Related U.S. Application Data

(60) Provisional application No. 60/790,394, filed on Apr. 7, 2006.

(51) Int. Cl.
*F16H 25/08* (2006.01)

(52) U.S. Cl. .............. 74/55; 251/263; 185/39; 185/40 B

(58) Field of Classification Search ............. 185/37, 185/39, 40 B; 74/55, 421 A, 421 R, 567, 74/569; 251/251; 137/554
See application file for complete search history.

(56) References Cited

U.S. PATENT DOCUMENTS

| | | | |
|---|---|---|---|
| 2,025,549 A * | 12/1935 | Prince | 218/116 |
| 2,062,459 A * | 12/1936 | Lee | 74/55 |
| 4,638,676 A | 1/1987 | Lively et al. | |
| 5,555,776 A | 9/1996 | Gazza | |
| 5,667,283 A | 9/1997 | Drennen et al. | |
| 5,735,128 A | 4/1998 | Zhang et al. | |
| 6,422,099 B1 | 7/2002 | Sun | |
| 2002/0134441 A1 | 9/2002 | Kusumoto et al. | |
| 2003/0136389 A1 | 7/2003 | Brosseau et al. | |
| 2009/0160275 A1* | 6/2009 | Keefover et al. | 310/83 |
| 2009/0165579 A1* | 7/2009 | Johansson | 74/55 |

FOREIGN PATENT DOCUMENTS

| | | |
|---|---|---|
| DE | 197 30 998 A1 | 1/1998 |
| EP | 0 687 842 A2 | 12/1995 |
| EP | 1 637 784 | 3/2006 |
| FR | 1 305 601 | 10/1962 |

(Continued)

*Primary Examiner* — Alicia Torres
(74) *Attorney, Agent, or Firm* — Warn Partners, P.C.

(57) ABSTRACT

An actuator assembly having a housing, at least one rotating gear member including a cam, and an actuator device operably connected to the rotating gear member, operably contained in the housing, for rotating the gear member. Also included is a bearing member operably associated with the cam such that when the actuator device is actuated for rotation of the gear member, the bearing member moves on the cam for providing relative motion between the bearing member and the rotating gear member. The actuator device is selected from a torque generating device or a device having linear movement.

22 Claims, 7 Drawing Sheets

FOREIGN PATENT DOCUMENTS

| | | |
|---|---|---|
| GB | 854136 | 11/1960 |
| GB | 2 017 220 | 10/1979 |
| GB | 2 234 033 | 1/1991 |
| GB | 2234033 A * | 1/1991 |
| GB | 2 336 420 | 10/1999 |
| JP | 2000 136760 A | 5/2000 |
| JP | 2002 286150 A | 10/2002 |
| WO | WO 97/30616 | 8/1997 |
| WO | WO 01/66984 | 9/2001 |
| WO | WO 2005/021954 | 3/2005 |

* cited by examiner

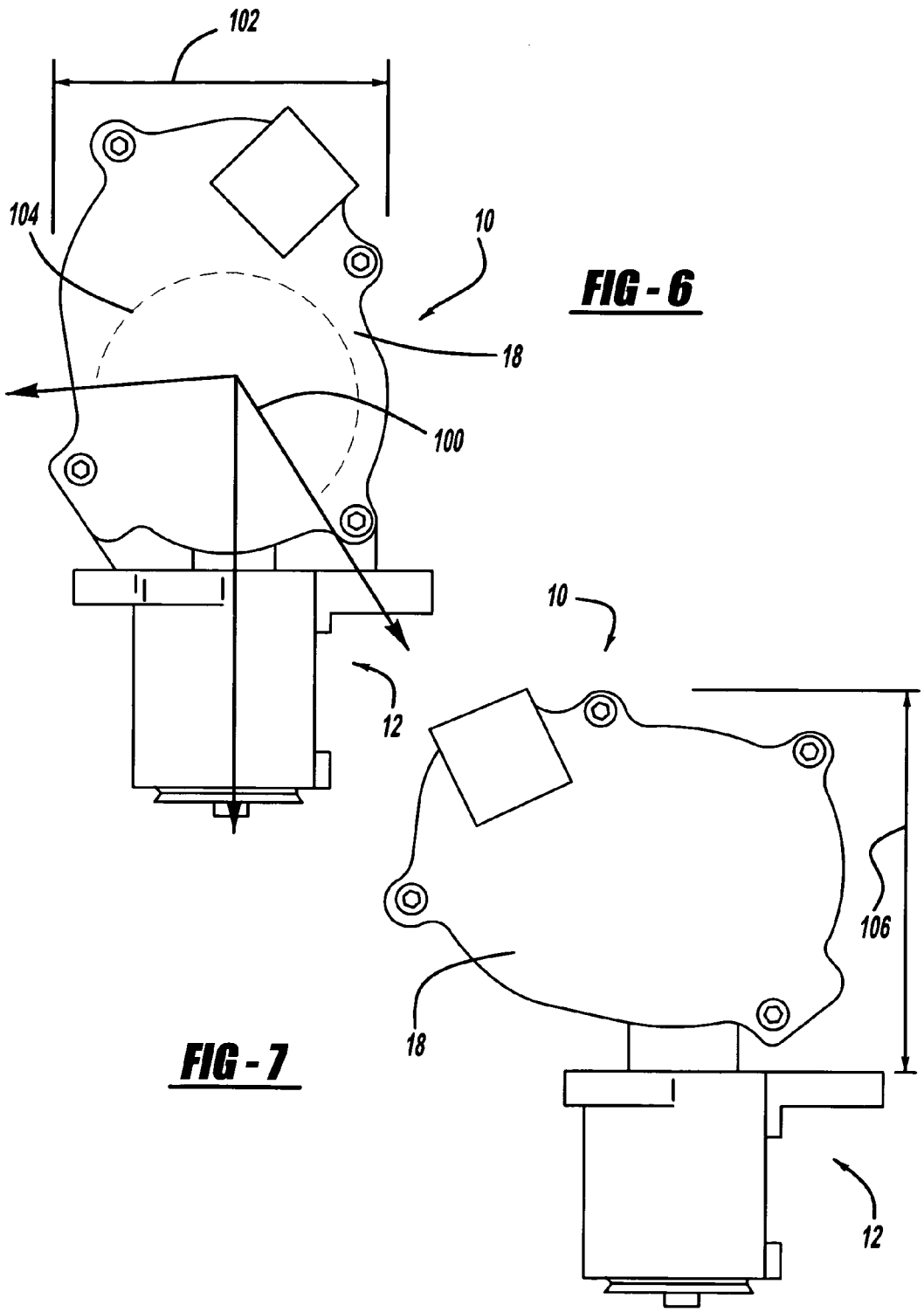

ACTUATOR WITH INTEGRATED DRIVE MECHANISM

CROSS-REFERENCE TO RELATED APPLICATIONS

This application is a National Stage of International Application No. PCT/US2007/008323, filed Apr. 4, 2007. This application claims the benefit of U.S. Provisional Application No. 60/790,394, filed on Apr. 7, 2006. The disclosures of the above applications are incorporated herein by reference.

FIELD OF THE INVENTION

The present invention relates to an actuator assembly for use in a vehicle. More particularly the present invention relates to an arrangement for converting rotary motion from an actuator to axial motion.

BACKGROUND OF THE INVENTION

Actuators are used to operate a number of devices such as fluid control valves, or control mechanisms used on turbochargers. These actuators may have axial motion, or they may have rotary motion that is converted to axial motion. Converting rotary-to-axial motion requires an arrangement that efficiently translates the motion. Often times such arrangements require an additional element or component that increases the complexity of the device. It is desirable to develop arrangements that eliminate complex or additional components, as well as provide greater packaging advantages. Thus, the overall size, weight and cost of the device is reduced.

SUMMARY OF THE INVENTION

The present invention is directed to an actuator assembly having a housing, at least one rotating gear member including a cam, an actuator device operably connected to the rotating gear member, operably contained in the housing, for rotating the gear member. The present invention also includes a bearing member operably associated with the cam such that when the actuator device is actuated for rotation of the gear member, the bearing member moves on the cam for providing relative motion between the bearing member and the rotating gear member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a front plan view of an actuator assembly, with the housing positioned to minimize the overall width of the actuator assembly, according to the present invention;

FIG. 7 is a front plan view of an actuator assembly, with the housing positioned to minimize the overall height of the actuator assembly, according to the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
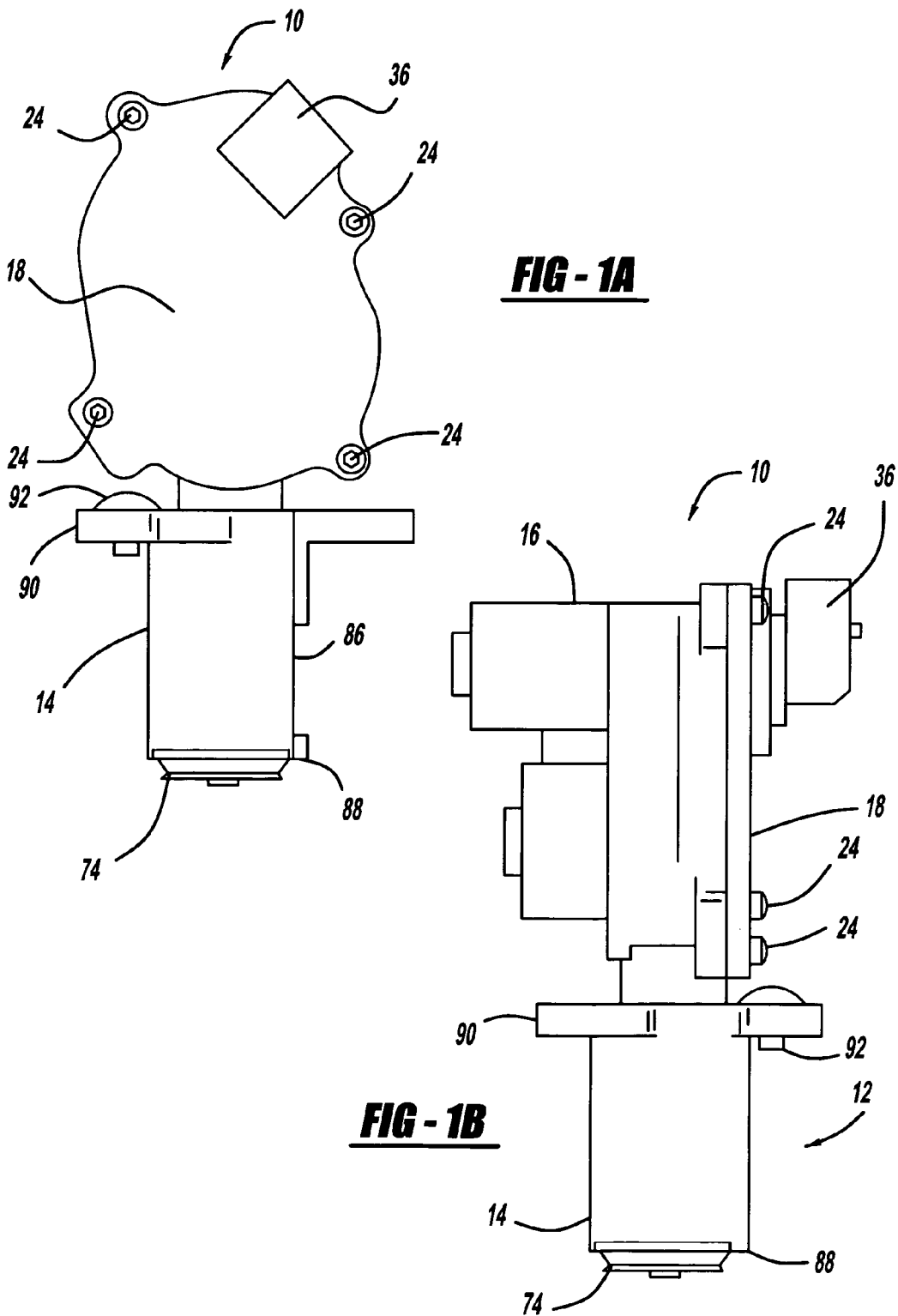
FIG. 1a is a front plan view of an actuator assembly, according to the present invention.
FIG. 1b is a side plan view of an actuator assembly, according to the present invention.
Figure 2:
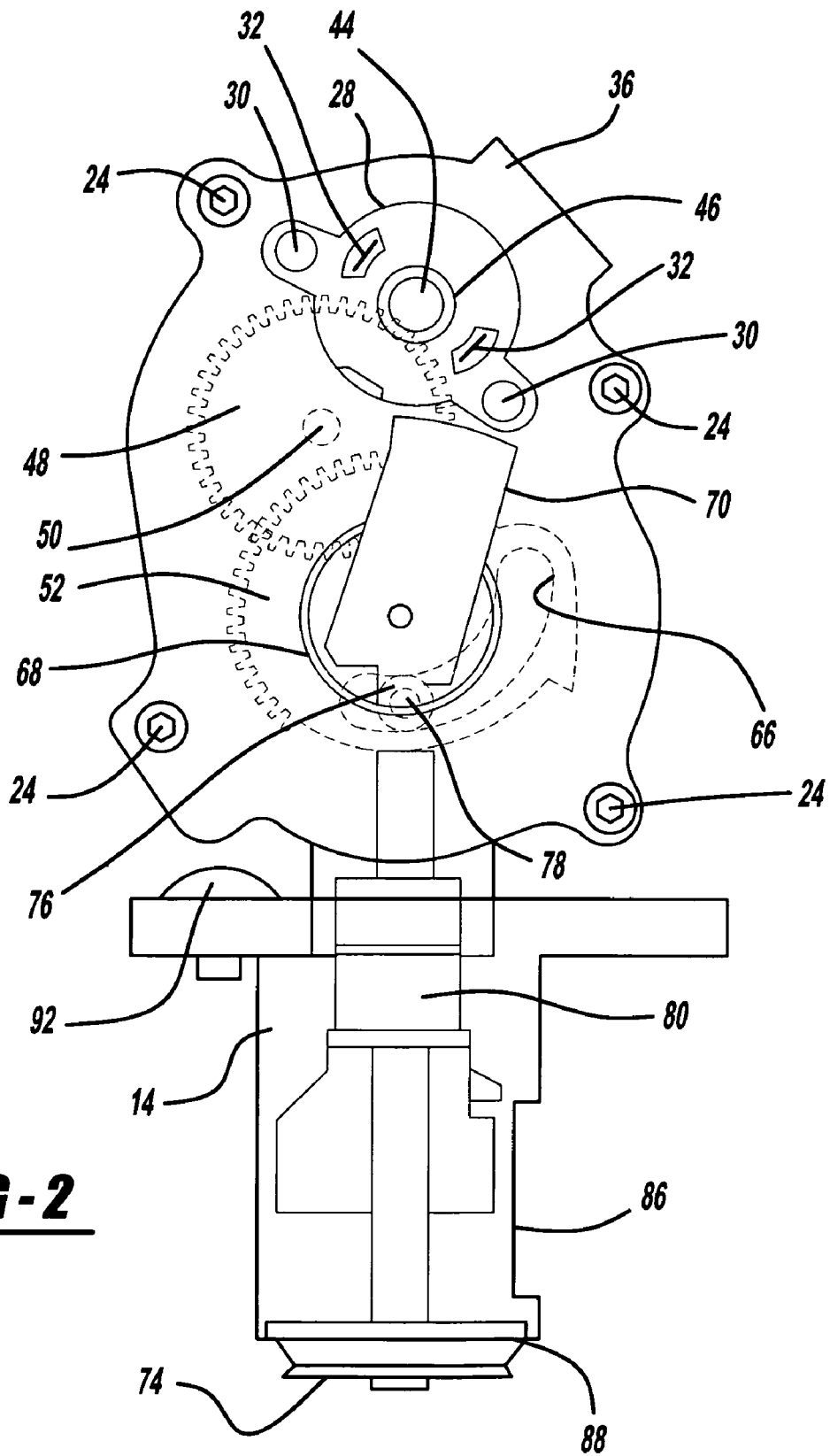
FIG. 2 is a sectional front plan view of an actuator assembly in a closed position, according to the present invention.
Figure 3:
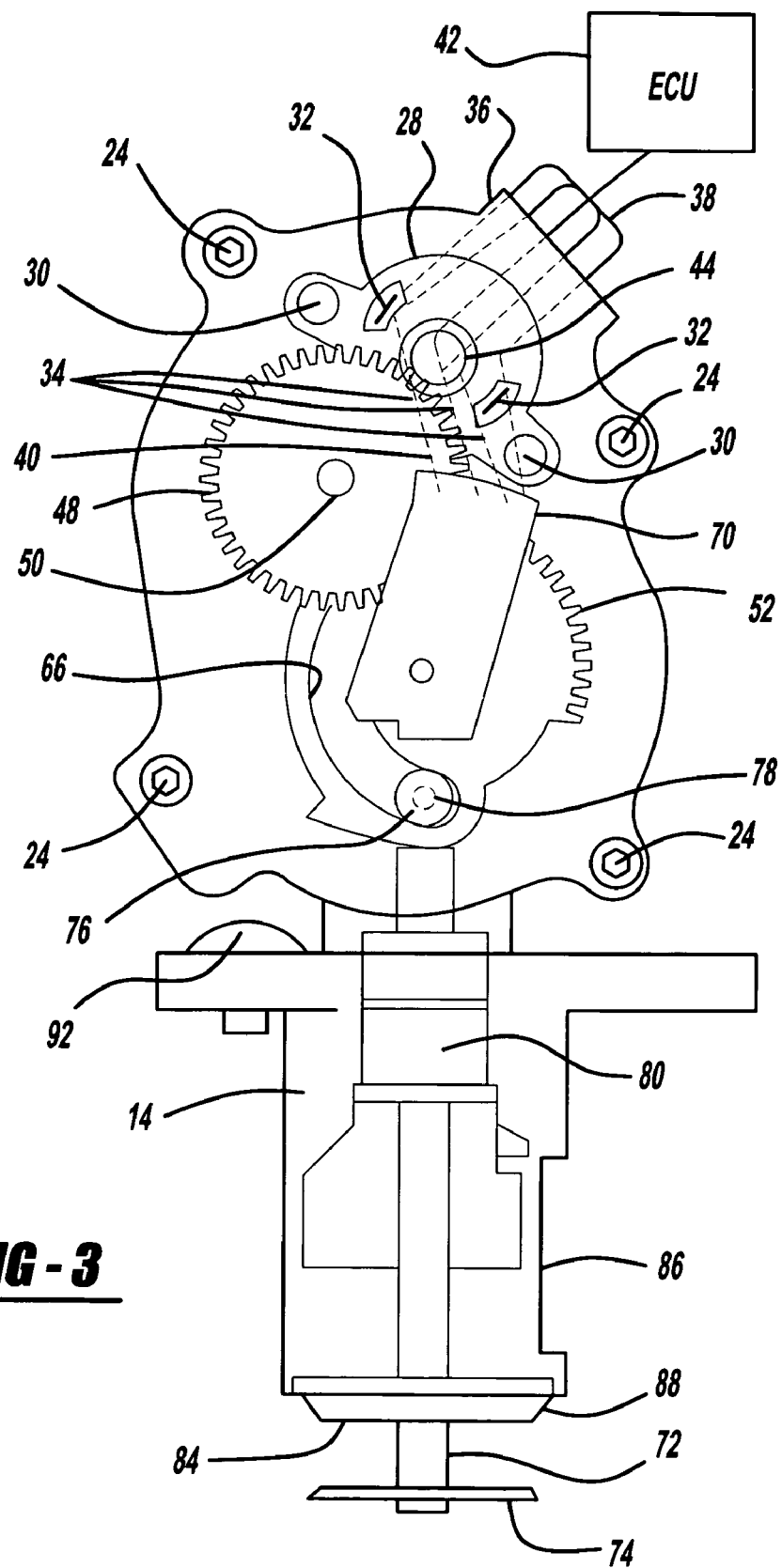
FIG. 3 is a second sectional front plan view of an actuator in an open position, according to the present invention.

FIGS. 1a and 1b show the front and side views of an actuator assembly 10 which includes a valve assembly 12. Referring to FIGS. 1-4, actuator assembly 10 has a valve housing 14 and an actuator housing 16 designed to accept a connector/cover 18 with an integrated position sensor 20. An elastomer seal 22 is used to seal the connector/cover 18 to the actuator housing 16. Screws 24 secure the connector/cover 18 to the housing 16. An actuator device such as a DC motor 26 is secured by a bracket 28, and screws 30 to the actuator housing 16. The connector/cover 18 has an integrated leadframe 40 made of multiple electrical conductors 34. Terminals 32, of the motor 26, interconnect with the electrical conductors 34 of the electrical connector/cover 18. The connector/cover 18 has a connector 36 with terminals 38 that provide an external connection to a suitable electronic control unit (ECU) 42. The terminals 38 may also be a portion of the leadframe 40.

The rotating shaft 44 of the motor 26 is fitted with pinion gear 46 that engages with an intermediate gear 48. The intermediate gear 48 is located by pin 50 in actuator housing 16. The intermediate gear 48 engages output gear 52. The output gear 52 rotates about output gear shaft 54, which is located in the actuator housing 16. The shaft 54 is guided by a bearing member 56 and bushing 58 that are also located in actuator housing 16. The clip 60 secures the shaft 54 in the actuator housing 16. A cup plug 62 is used to cover the opening 64 in the actuator housing 16. A cam shown here in the form of a cam slot 66 is formed in output gear 52.

A sensor rotor 68 is attached to the shaft 54 or the output gear 52 by a suitable method such as a plastic overmolding. Alternate fastening methods include ultrasonic welding, adhesives, or a "snap fit." The sensor rotor 68 is positioned relative to the associated position sensor 20 that is part of the sensing circuit 70 attached to the connector/cover 18. The position sensor 20 can be any type of sensor capable of detecting the position of the sensor rotor 68. For example, one type of position sensor 20 is a non-contact position sensor, such as an induction sensor. Such a sensor can have an inductor overmolded onto the output gear 52. The electrical connections to the sensing circuit 70 are made through the leadframe 40, conductors 34, and terminals 38. The sensor rotor 68 couples a signal from a transmitter to a receiver on the position sensing circuit 70. The position sensing circuit 70 provides an output signal that is relative to the rotation and position of the output gear 52.

A stem member or valve stem 72 is fitted with a valve member or poppet valve 74 at one end and a bearing member or bearing 76 held by a pin 78 at the opposite end. The valve stem 72 is guided by a bushing 80 which is retained in valve housing 14 by suitable manner such as a press fit. Valve housing 14 has an inlet 84 and outlet 86. Inlet 84 is fitted with a valve seat 88 that will seat poppet valve 74 and block flow between the inlet 84 and outlet 86.

Figure 4:
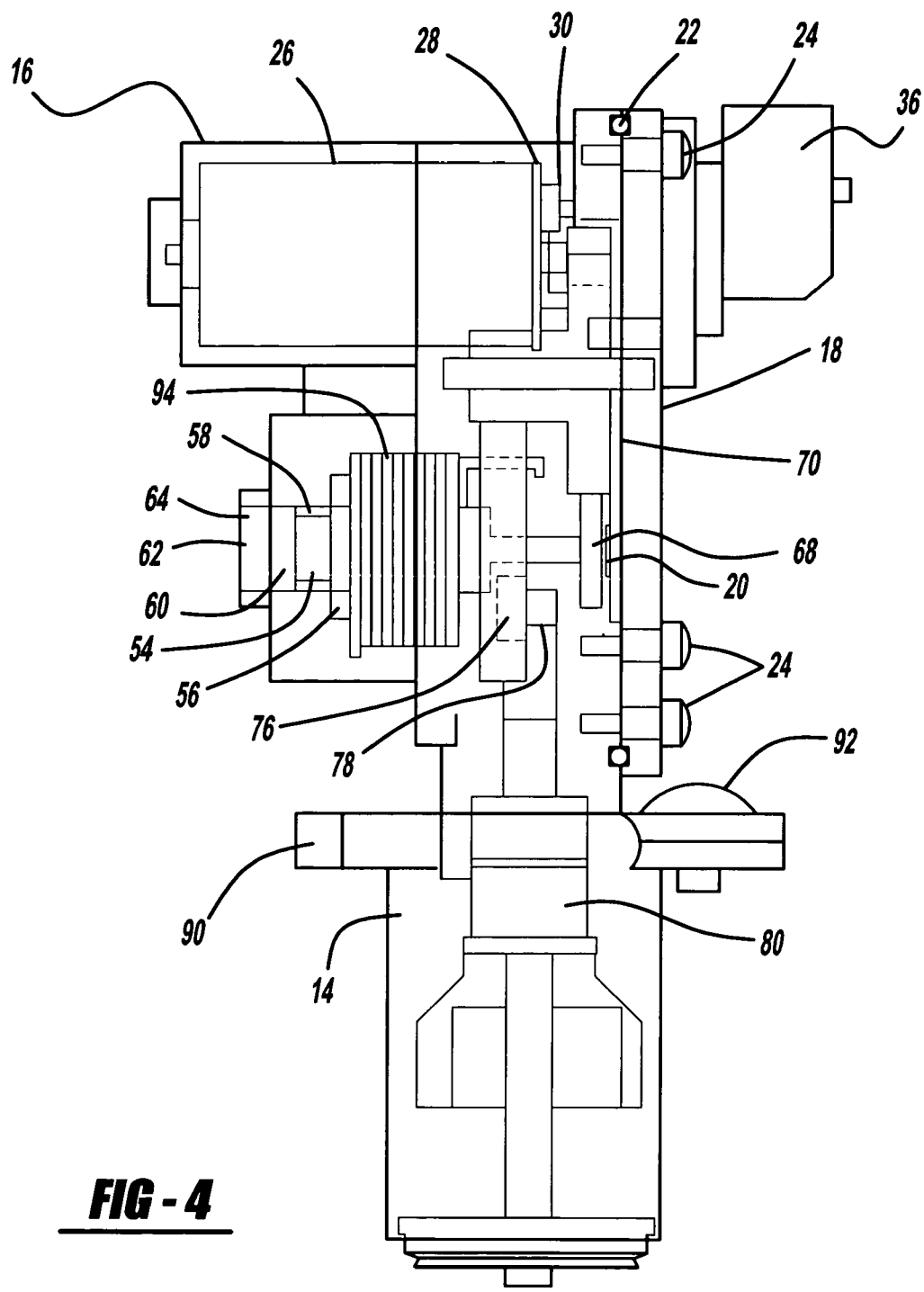
FIG. 4 is a sectional side plan view of an actuator assembly, according to the present invention.

It should be noted the actuator housing 16 and valve housing 14 are shown as a single component. The actuator housing 16 and valve housing 14 can also be separated into two components. For example, the actuator housing 16 and valve housing 14 could be separated at the flange 90 and joined by a suitable means such as threaded fasteners 92 as shown in FIG. 4.

A spring 94 is coaxial with the output gear shaft 54. The spring 94 has features that engage the output gear 52 and the actuator housing 16. The spring 94 is designed to cause the output gear 52 to rotate in a counterclockwise direction when looking at FIGS. 2 and 3. The cam slot 66, formed in the output gear 52, is designed to receive the bearing 76 that is attached to one end of valve stem 72. The cam slot 66 is shaped to cause the bearing 76, valve stem 72, and poppet valve 74 to move in the direction of the valve seat 88 when the spring 94 applies the counterclockwise torque to the output gear 52. However, the rotation of the output gear 52 can be reversed so that the bearing 76, valve stem 72, and poppet valve 74 can move away from the valve seat 88 when the spring 94 applies the counterclockwise torque to the output gear 52. The torque of the spring 94 is sufficient to cause the poppet valve 74 to seat on valve seat 88 and block flow between the valve inlet 84 and outlet 86.

When the output gear 52 is moved in a first or clockwise direction; a first surface of the cam slot 66 acts on the bearing 76 causing the bearing 76 and stem member 72 to move axially in one direction. When the output gear 52 is moved in a second or counterclockwise direction; a second surface of the cam slot 66 acts on the bearing member 76 causing the bearing 76 and stem member 72 to move in a second axial direction. The actuator assembly 10 operates through the use of the ECU 42, the ECU 42 provides a suitable electrical control signal by way of terminals 38, leadframe 40, conductors 34, and motor terminals 32.

The motor 26 receives a control signal from the ECU 42 and develops torque that is relative to the strength of the signal. The torque generated by the motor 26 will be transmitted from the pinion gear 46, through the intermediate gear 48 to the output gear 52. This torque will oppose the resistance of the spring 94. When the control signal and the resulting torque are sufficient, the torque exceeds the resistance of the spring 94, and causes the output gear 52 to rotate. Progressively increasing the control signal provides a higher resultant torque that increases the degree of the output gear 52 rotation. Decreasing the control signal reduces the degree of output gear 52 rotation.

The cam slot 66, formed in output gear 52, engages with bearing 76 that is attached to valve stem 72 by pin 78. The rotation of output gear 52 and cam slot 66, forces the bearing 76, pin 78, valve stem 72, and poppet valve 74 to move in an axial direction that seats or unseats the poppet valve 74 from valve seat 88 either block flow or allow flow between the inlet 84 and the outlet 86.

The contour of the cam slot 66 determines the rate of axial movement versus output gear 52 rotation. The contour of the cam slot 66 also, in part, determines the operating force acting on the bearing 76, valve stem 72, and poppet valve 74. The contour is varied through the rotation to provide a variable poppet valve 74 opening/flow rate through the axial stroke of the poppet valve 74 to provide the desired operating characteristics.

The contour of the cam slot 66 also controls the operating force, at a specific rotation/stroke. In one embodiment, the contour of the cam slot 66 is configured to provide a continuously variable rate through the rotation of the output gear 52. Controlling the mechanical advantage through the rotation of the output gear 52 and cam slot 66 provides a method of matching the required torque of the valve assembly 12 to the available torque of the motor 26. For example, in an alternate embodiment, a higher torque may be provided at a specific point through the rotation of output gear 52, by adjusting the contour of the cam slot 66. As the motor 26 rotates the pinion gear 46, intermediate gear 48, and output gear 52, the bearing 76 moves through the cam slot 66 changing the position of the valve stem 72 and poppet valve 74 relative to the output gear 52, thereby changing the amount of force transferred therebetween.

Sensing circuit 70 provides an output signal that is relative to the degree of output gear 52 rotation and axial poppet valve 74 movement. This output serves as an indication of relative flow through the poppet valve 74.

In another aspect, the electronic sensing circuit 70 may also be programmed to provide a specific signal range for a given valve stem 72 and poppet valve 74 position. For example, the poppet valve 74 in a closed position may be programmed within a specific sensing voltage range. It is believed that this capability improves the accuracy of valve stem 72 and poppet valve 74 position, as well as compensates for component and assembly variation. One way of achieving this is by accessing the sensing circuit 70 using a calibration procedure.

The position sensor 20 and the output signal of the sensing circuit 70 are part of a closed loop control system for the poppet valve 74. The ECU 42 is programmed with a map of engine operating conditions and a desired flow for each condition. The desired flow is translated to the sensing circuit 70 output signal and ECU 42 signal. The ECU 42 provides the signal to the motor 26 and causes the poppet valve 74 to move to a desired position. The ECU 42 adjusts the signal to achieve-or-maintain the desired poppet valve 74 position.

Figure 8:
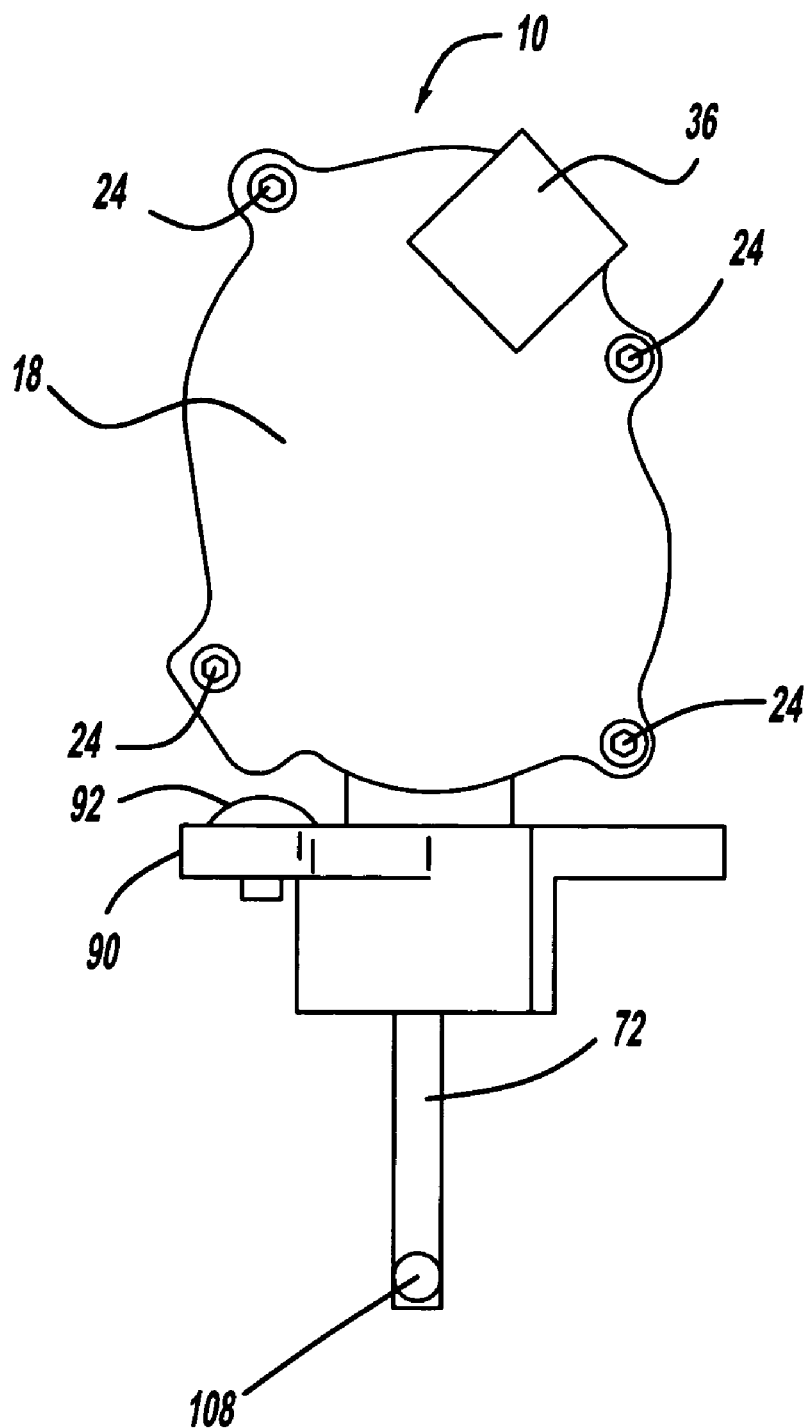
FIG. 8 is a front plan view of an actuator assembly with the poppet valve replaced with a pin and the valve housing removed, according to the present invention.

The use of the cam slot 66, integrated into the output gear 52, is an effective means of converting the rotary motion of the motor 26 to axial motion of the valve stem 72. It is to be appreciated that this concept is also applicable to other devices that require axial movement. For example, the valve housing 14 portion of the actuator assembly 10 could be removed to expose the valve stem 72. The valve stem 72 can be connected to any device that would require axial operation, such as the control device of a turbocharger as shown in FIG. 8. In FIG. 8, a portion the valve housing 14 has been removed to expose the valve stem 72, and the poppet valve 74 has been replaced with a pin 108.

The integration of the cam slot 66 is based upon the manufacturing process of the component. For example, in one embodiment, the cam slot 66 is molded by an injection molded process, however, the cam slot 66 may also be cast if a metal casting process is used, or compacted if a powdered metal process is used. In other embodiments, the cam slot 66 is made as a separate part and attached by suitable means such as plastic overmolding, press fit, riveting, welding, brazing, or adhesive. Also, it is not necessary that the cam slot 66 be completely formed through the output gear 52. In an alternate embodiment, a wall that limits the movement of the bearing 76 and valve stem 72 is utilized to provide the cam guidance.

Figure 5A:
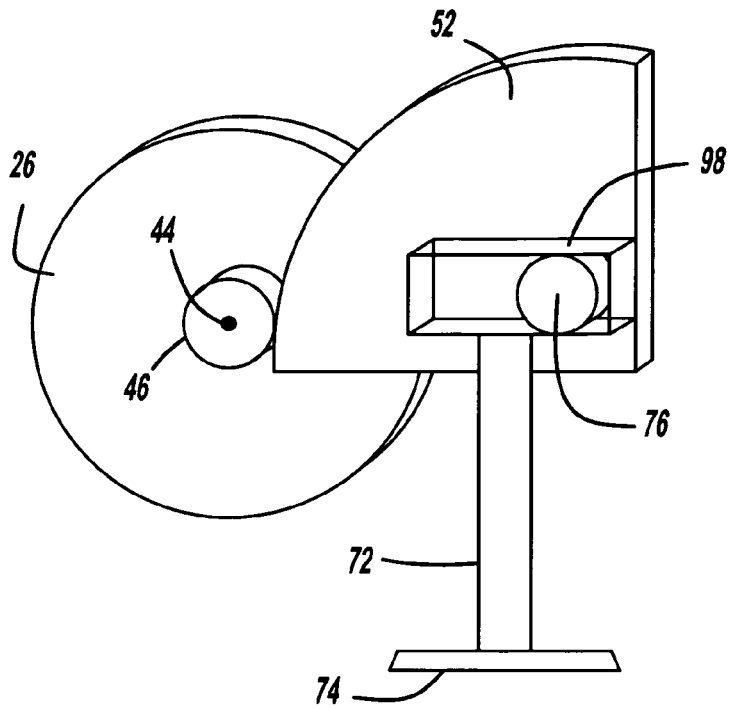
FIGS. 5A and 5B are isometric views of an alternate embodiment of the present invention.
Figure 5B:
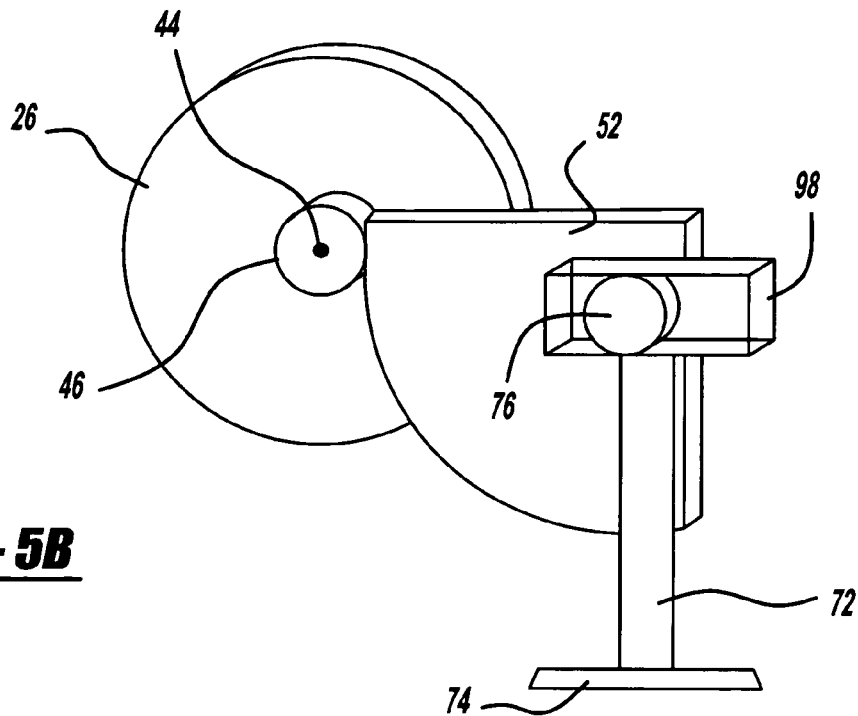

Variations of the invention may be used for translating the motion. Referring to FIGS. 5a and 5b, the bearing 76 is attached to the output gear 52 and is offset from the center of rotation of the output gear 52. A guide slot 98 is formed with or attached to the valve stem 72; the guide slot 98 is operably configured for receiving the bearing 76: The valve stem 72 will move in an axial motion as the output gear 52 is rotated in either a clockwise or counterclockwise motion. The rate of travel and the ratio of mechanical advantage are dependent upon the shape of the slot 98, position of the slot 98, and the position of the bearing 76. In this embodiment, the pinion gear 46 is directly in mesh with the output gear 52.

In the first position, shown in FIG. 5a, the bearing 76 it located at one end of the guide slot 98. As the output gear 52 rotates, the bearing 76 moves through the guide slot 98 and moves about the axis of the output gear 52. As the output gear 52 continues to rotate, the guide slot 98, valve stem 72 and poppet valve 74 arrive in the position shown in 5b. This embodiment is also not limited for use with a poppet valve 74, it is within the scope of the present invention to use the present invention in other devices that require rotary to axial motion.

Another benefit, of the simplified mechanism for translating the rotary to axial motion, is flexible packaging. Referring to FIG. 6, the actuator housing 16 is in same position as shown in FIGS. 1-4. In this position, the housing 16 is positioned such that the width 102 of the actuator assembly 10 is minimized. In another embodiment shown in FIG. 7, the actuator housing 16 has been manufactured such that the height 106 of the actuator assembly 10 is minimized.

The actuator housing 16 is configured to have any number of various positions about the axis 100 of the output gear shaft 54 allowing numerous packaging positions relative to the valve assembly 12 and mounting features. Configuring the actuator housing 16 to have a predetermined position about axis 100 is achieved during the manufacturing process, making the position of the actuator housing 16 permanent. The actuator housing 16 is configured to have any number of positions within a range 104 about axis 100. This allows the present invention to have the flexibility of being used in a greater number of applications requiring rotary to axial motion. In either one of the positions shown in FIG. 6 or 7, and in any position therebetween, the actuator assembly 10 operates in the same manner.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An actuator assembly, comprising:
    a housing;
    at least one rotating gear member including a cam;
    an actuator device operably connected to said at least one rotating gear member, operably contained in said housing, for rotating said at least one rotating gear member;
    a bearing member operably associated with said cam such that when said actuator device is actuated for rotation of said at least one rotating gear member, said bearing member moves on said cam for providing relative motion between said bearing member and said at least one rotating gear member;
    a shaft, said at least one rotating gear member being operable with said shaft, and said shaft is supported in said housing;
    a spring mounted about said shaft and engaged with said housing, and said at least one rotating gear member mounted on said shaft, said spring operates to resist torque applied from said actuator device, and holds said rotating gear member mounted on said shaft in a stationary position, said spring also applying force to said rotating gear member mounted on said shaft when no torque is applied from said actuator device; and
    a position sensor for sensing the position of either of said at least one rotating gear member, said shaft, or said bearing member.

2. The actuator assembly of claim 1, wherein said cam is a slot formed in said at least one rotating gear member, varying the rate at which said bearing member moves on said cam to either increase or decrease a mechanical advantage created by said cam and said bearing member, said cam being an open slot or a closed slot.

3. The actuator assembly of claim 1, wherein said cam is a raised surface on said at least one rotating gear member varying the rate at which said bearing member moves on said cam to either increase or decrease a mechanical advantage created by said cam and said bearing member.

4. The actuator assembly of claim 1, wherein said cam is a depressed surface on said at least one rotating gear member varying the rate at which said bearing member moves on said cam to either increase or decrease a mechanical advantage created by said cam and said bearing member.

5. The actuator assembly of claim 1, wherein said position sensor is an integrated position sensor and is one selected from the group comprising an induction sensor, a magneto resistive sensor, a hall effect sensor, and a resistive sensor.

6. The actuator assembly of claim 5, wherein said induction sensor further comprises a position sensing component operably associated with said at least one rotating gear member, said shaft, or said bearing member, and a sensor operably mounted near said position sensing component.

7. The actuator assembly of claim 1, wherein said actuator assembly includes an axis, and said housing is positioned about said axis to minimize the overall height of said actuator assembly.

8. The actuator assembly of claim 1, wherein said actuator assembly includes an axis, and said housing is positioned about said axis to minimize the overall width of said actuator assembly.

9. The actuator assembly of claim 1, wherein said bearing member is selected from the group comprising a ball bearing, bushing, a pin, a needle bearing, and a sleeve over a pin.

10. The actuator assembly of claim 1, wherein said bearing member is moved by said cam in a first direction when said gear member is rotated in a first direction and said bearing member is moved by said cam in a second direction when said gear member is rotated in a second direction.

11. An actuator assembly for a motor vehicle, comprising:
    at least one rotating gear member connected to an actuator device, positioned within a housing, the housing having an axis;
    a cam slot operably associated with said at least one rotating gear member;
    a stem member having a bearing member operably associated with said cam slot such that rotation of said gear moves said stem member in a linear motion;
    wherein said housing is selectively configured to have varied preselected positions relative to said axis to change the overall height and width of said actuator assembly relative to said stem member prior to manufacture of said actuator assembly; and
    wherein said bearing member and the shape of said cam slot create a mechanical advantage such that when said actuator device is actuated said at least one rotating gear member rotate, causing said cam slot to move said bearing member, thereby moving said stem member between a first position and a second position, and a first surface of said cam slot moves said stem member and said bearing member in a first direction when said gear member is rotated in a first direction and a second surface of said cam slot moves said stem member and said bearing member in a second direction when said gear member is rotated in a second direction, and said at least one rotating gear member is operably connected to a shaft, said shaft being operably supported by said housing, and a spring circumscribes said shaft and is engaged with said housing and said at least one rotating gear member mounted on said shaft, said spring is configured to provide resistance against rotation of said actuator device, and operates to hold said at least one rotating gear member mounted on said shaft in a stationary position.

12. The actuator assembly for a motor vehicle of claim 11, wherein said actuator device is a linear-type actuator, or a rotary type actuator, and said actuator device is used for controlling a valve or a turbocharger actuator.

13. The actuator assembly for a motor vehicle of claim 11, further comprising an integrated position sensor operably associated with either of said at least one rotating gear member, said shaft, or said bearing member, said integrated position sensor being selected from the group comprising a magneto resistive sensor, a hall effect sensor, and a resistive sensor.

14. The actuator assembly for a motor vehicle of claim 13, wherein said integrated position sensor is an induction sensor, said induction sensor is further comprised of an inductor mounted to said at least one rotating gear member, said shaft, or said bearing member, and a sensor located in proximity to said inductor.

15. The actuator assembly for a motor vehicle of claim 11, wherein said cam slot is integrated with said stem member, and said bearing member is positioned on one of said at least one rotating gear member.

16. An actuator assembly for directing exhaust gas flow in a motor vehicle, comprising:
   at least one rotating gear member located in a housing having an axis, said at least one rotating gear member having a cam slot;
   an actuator device operably associated with said at least one rotating gear member,
   a stem member having a bearing member operably associated with said cam slot;
   a shaft, supported in said housing, for supporting said at least one rotating gear member;
   a spring mounted about said shaft, connected to said housing and said at least one rotating gear member supported by said shaft, said spring used to provide resistance against rotation of said shaft in one direction; and
   wherein said actuator device actuates said at least one rotating gear member against said resistance provided by said spring, in turn causing said bearing member to rotate in said cam slot, displacing said stem member, and said stem and said bearing member are moved by a first surface of said cam slot in a first direction when said gear member is rotated in a first direction and, and said stem and said bearing member are moved by a second surface of said cam slot in a second, substantially opposite direction when said gear member is rotated in a second direction.

17. The actuator assembly of claim 16, wherein said cam slot and said bearing member create a mechanical advantage, wherein the shape of said cam slot defines said mechanical advantage.

18. The actuator assembly of claim 16, wherein the shape of said cam slot increases the amount of force applied to said bearing member at a specific point through the rotation of said at least one rotating gear member.

19. The actuator assembly of claim 16, wherein the shape of said cam slot decreases the amount of force applied to said bearing member at a specific point through the rotation of said at least one rotating gear member.

20. The actuator assembly of claim 16, wherein said bearing member is integrated with said at least one rotating gear member, said cam slot is operably associated with said stem member, said bearing member is selected from the group consisting of a bushing, a pin, a needle bearing, a ball bearing, or sleeve over a pin.

21. The actuator assembly of claim 16, further comprising a position sensor for sensing the position of either of said at least one rotating gear member, said shaft, or said bearing member, wherein said position sensor is an integrated position sensor and is one selected from the group comprising an induction sensor, a magneto resistive sensor, a hall effect sensor, and a resistive sensor.

22. The actuator assembly of claim 21, wherein said induction sensor further comprises a position sensing component operably associated with said at least one rotating gear member, said shaft, or said bearing member, and a sensor operably mounted near said position sensing component.

* * * * *